United States Patent
Jo (10) Patent No.: US 8,339,443 B2
(45) Date of Patent: *Dec. 25, 2012

(54) THREE-DIMENSIONAL IMAGE DISPLAY METHOD AND APPARATUS

(75) Inventor: Chan-young Jo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/314,901

(22) Filed: Dec. 8, 2011

(65) Prior Publication Data

US 2012/0075299 A1 Mar. 29, 2012

Related U.S. Application Data

(63) Continuation of application No. 11/952,532, filed on Dec. 7, 2007, now Pat. No. 8,094,185.

(30) Foreign Application Priority Data

May 15, 2007 (KR) .................. 10-2007-0047089

(51) Int. Cl.
*G02B 27/32* (2006.01)

(52) U.S. Cl. ............................................ 348/51; 359/24
(58) Field of Classification Search .................. 348/46, 348/51, 54; 345/419, 7; 359/24
See application file for complete search history.

(56) References Cited

U.S. PATENT DOCUMENTS

| 6,765,545 | B2 | 7/2004 | Son et al. |
| 7,852,558 | B2 | 12/2010 | Uehara et al. |
| 8,094,185 | B2 * | 1/2012 | Jo ................ 348/51 |

FOREIGN PATENT DOCUMENTS

KR 10-2005-0004823 A 1/2005

* cited by examiner

*Primary Examiner* — Moustafa M Meky
(74) *Attorney, Agent, or Firm* — Sughrue Mion, PLLC (57) ABSTRACT

A three-dimensional image display method, includes: displaying a three-dimensional image including a left eye image signal and a right eye image signal displayed at a display focus angle; determining whether to change a viewing focus angle with respect to the display focus angle; calculating a pixel distance between the left eye image signal and the right eye image signal if it is determined to change the viewing focus angle; and displaying indicator marks at positions spaced as much as a half of the pixel distance from a center of a screen in leftward and rightward directions.

10 Claims, 7 Drawing Sheets

THREE-DIMENSIONAL IMAGE DISPLAY METHOD AND APPARATUS

CROSS-REFERENCE TO RELATED APPLICATIONS

This application is a continuation of application Ser. No. 11/952,532 filed on Dec. 7, 2007, and issued as U.S. Pat. No. 8,094,185 on Jan. 10, 2012, which claims priority from Korean Patent Application No. 10-2007-0047089, filed on May 15, 2007 in the Korean Intellectual Property Office, the disclosure of which are incorporated herein by reference. The entire disclosure of the prior applications are considered part of the disclosure of the accompanying divisional application and are hereby incorporated by reference.

BACKGROUND OF THE INVENTION

1. Field of the Invention

Apparatuses and methods consistent with the present invention relate to a three-dimensional image display method and apparatus, and more particularly, to a three-dimensional image display method and apparatus which displays a three-dimensional image and changes a viewing focus angle of a viewer according to a display focus angle of an object recorded in an image source.

2. Description of the Related Art

A three-dimensional image includes a left eye image signal and a right eye image signal which are displayed at a display focus angle. If the left and right eye image signals are supplied to a display apparatus, the display apparatus sequentially divides the received left and right eye image signals, and displays them thereon. If a person (hereinafter referred to as a "viewer") views an image displayed on the display apparatus by using a device (e.g., shutter glasses) which divides the left and right eye image signals, the divided left and right eye image signals are respectively input to left and right eyes of a viewer. Thus, a viewer may view the three-dimensional image.

Figure 1:
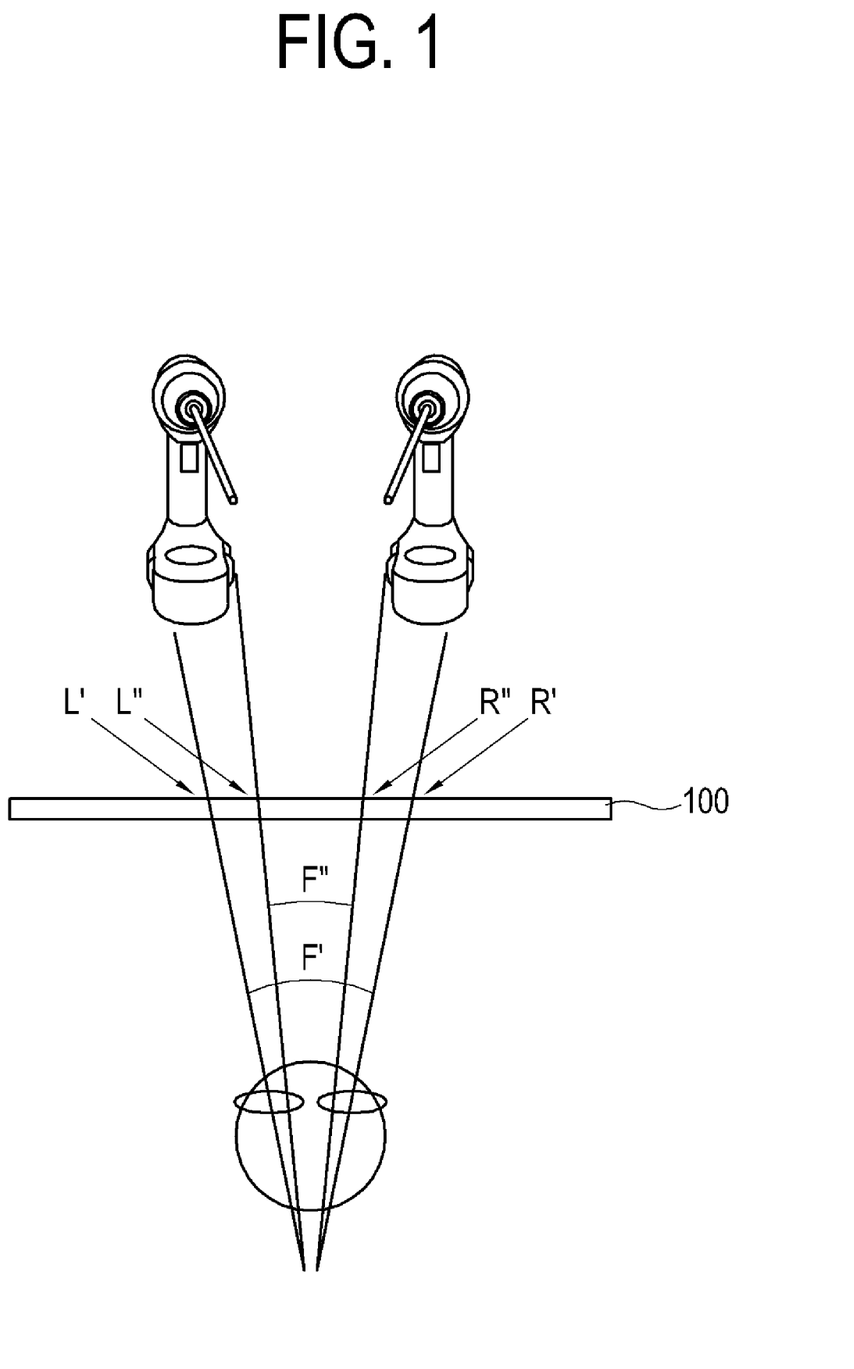
FIG. 1 illustrates a three-dimensional image source whose focus angle conforms or does not conform to a focus angle of a viewer.

If the three-dimensional image is displayed by a three-dimensional display apparatus, a viewer may perceive precise three-dimensional effect only if a viewer views an image with the viewing focus angle identical to the display focus angle of an object set in an image source provided by a camera or a computer graphic technology. A viewer may lose a focus of the three-dimensional image while viewing the image, or may repeatedly change a viewing angle until finding a focus to see the three-dimensional effect. As shown in FIG. 1, if a viewing focus angle F''' of a viewer conforms to a focus angle F' of an image source, a viewer may see the three-dimensional effect without difficulty. However, if the viewing focus angle F''' of the viewer does not conform to the focus angle F' of the image source, the viewer does not perceive the three-dimensional effect and searches for the focus.

That is, left and right image sources form an image on a screen (image-forming screen) 100 at positions L' and R' through the display focus angle F'. The viewer views the screen 100 at positions L'' and R'' through the viewing focus angle F'''. Thus, the viewing focus angle F''' of the viewer does not conform to the viewing focus angle F' of the image sources. The viewer may not perceive the three-dimensional effect until the viewing focus angle F''' of the viewer conforms to the focus angle F' of the image sources.

SUMMARY OF THE INVENTION

The present invention provides a three-dimensional image display method and apparatus which displays a three-dimensional image and changes a viewing focus angle if the viewing focus angle does not conform to a display focus angle of an object recorded in an image source to provide precise three-dimensional effect of an image.

According to an aspect of the present invention, there is provided a three-dimensional image display method, including: displaying a three-dimensional image including a left eye image signal and a right eye image signal displayed at a display focus angle; determining whether to change a viewing focus angle with respect to the display focus angle; calculating a pixel distance between the left eye image signal and the right eye image signal if it is determined to change the viewing focus angle; and displaying indicator marks on spots in leftward and rightward directions spaced as much as a half of the pixel distance from a center of a screen.

The determining whether the to change the viewing focus angle may include receiving a command to change the focus.

The calculating the pixel distance may include analyzing a display distribution of the left and right eye image signals to calculate a physical distance between the respective display distribution of the left and right eye image signals according to a histogram, and converting the physical distance into a pixel distance.

The method may further include storing the indicator marks in advance.

According to another aspect of the present invention, there is provided a three-dimensional image display apparatus which displays a three-dimensional image including a left eye image signal and a right eye image signal displayed at a display focus angle, the apparatus including: a display unit; an image signal processor; and a controller which determines whether to change a viewing focus angle with respect to the display focus angle while the three-dimensional image is displayed, calculates a pixel distance between the left eye image signal and the right eye image signal if it is determined to change the viewing focus angle, and controls the image signal processor to display indicator marks at positions spaced as much as half the pixel distance from a center of the display unit in leftward and rightward directions.

The apparatus may further include an input unit which receives a command to change the viewing focus angle, wherein the controller determines to change the viewing focus angle with respect to the display focus angle if the command is input through the input unit.

The controller may analyze display distributions of the left and right eye image signals according to a histogram to calculate a physical distance between the respective display distributions of the left and right eye image signals, and calculate a pixel distance between the left and right eye image signals by converting the physical distance into the pixel distance.

The apparatus may further include a memory which stores the indicator marks therein.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary. The present invention, however, may be realized as various types, and is not limited to the exemplary embodiments.

Figure 2:
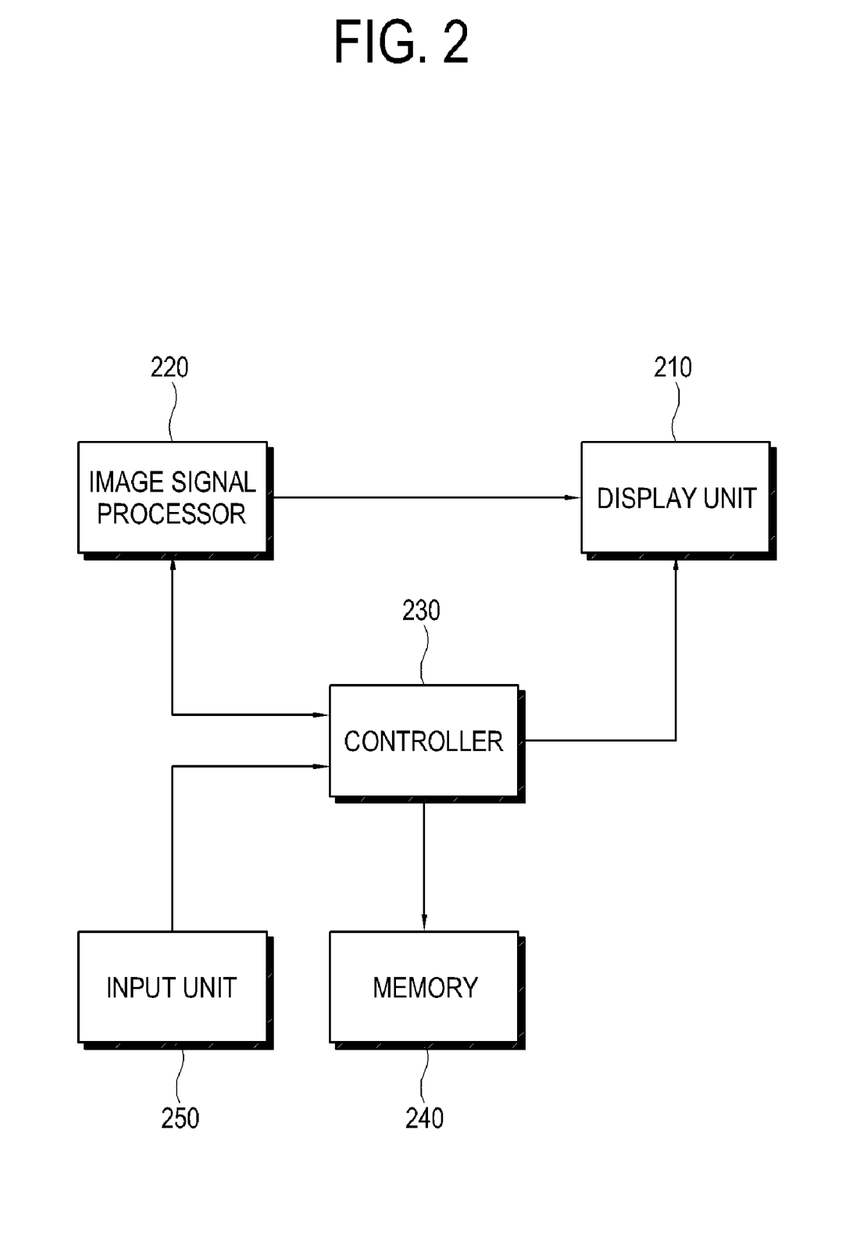
FIG. 2 is a schematic view of a configuration of a three-dimensional image display apparatus according to an exemplary embodiment of the present invention.

FIG. 2 is a schematic view of a configuration of a three-dimensional image display apparatus according to an exemplary embodiment of the present invention.

Referring to FIG. 2, the three-dimensional image display apparatus according to the exemplary embodiment of the present invention displays a three-dimensional image which has a left eye image signal and a right eye image signal displayed at a predetermined display focus angle. The three-dimensional image display apparatus includes a display unit 210 to display an image (e.g., still images, moving images and three-dimensional images), an image signal processor 220 to process an input image signal and provide the processed image signal to the display unit 210, a controller 230 to control the display unit 210 and the image signal processor 220, and an input unit 250 through which a viewer can input a command to change the viewing focus angle.

When the three-dimensional image is displayed, the controller 230 determines whether to change a viewing focus angle with respect to the display focus angle. If the controller 230 determines to change the viewing focus angle, the controller 230 calculates a pixel distance between the left and right eye image signals, and controls the image signal processor 220 to display indicator marks (400L and 400R in FIG. 5) at positions spaced as much as a half of the pixel distance from a center of the display unit 210 in leftward and rightward directions.

The input unit 250 may be provided as a remote controller of the three-dimensional image display apparatus, or be integrally provided in a main body of the three-dimensional image display apparatus. If the focus-changing command is input through the input unit 250 by a viewer, the controller 230 may determine to change the viewing focus angle with respect to the display focus angle. The controller 230 may control the image signal processor 220 to periodically display a particular indicator mark on the display unit 210 corresponding to the display focus angle regardless of a viewer's command. Then, a viewer viewing the three-dimensional image may view the indicator mark and change the viewing focus angle accordingly.

Figure 4:
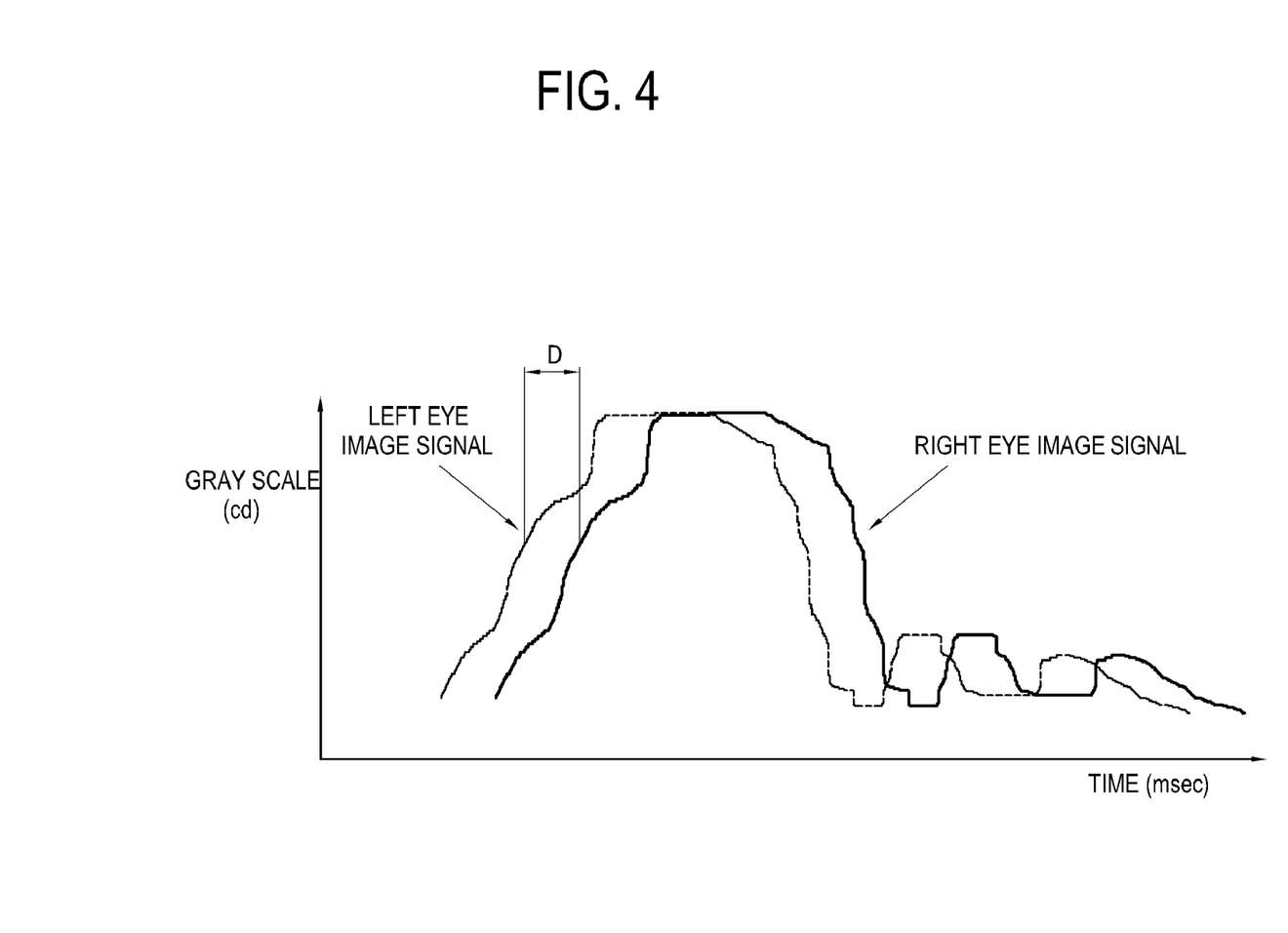
FIG. 4 illustrates a histogram of left and right eye image signals if a three-dimensional image is displayed.

The controller 230 analyzes display distribution of the left and right eye image signals according to a histogram as shown in FIG. 4 (to be described in detail later) and calculates a physical distance between the display distribution of the left and right eye image signals. The controller 230 may then calculate the pixel distance between the left eye image signal and the right eye image signal by converting the physical distance into the pixel distance. The controller 230 may calculate the pixel distance by using other types of information or data related to image signal analysis, instead of using the display distribution according to the histogram as described above.

The three-dimensional image display apparatus may further include a memory 240 to store the indicator marks therein. The indicator marks may be generated and stored in advance or may be generated as necessary.

With the foregoing configuration, a three-dimensional image display method of the three-dimensional image display apparatus according to the exemplary embodiment of the present invention will be described.

Figure 3:
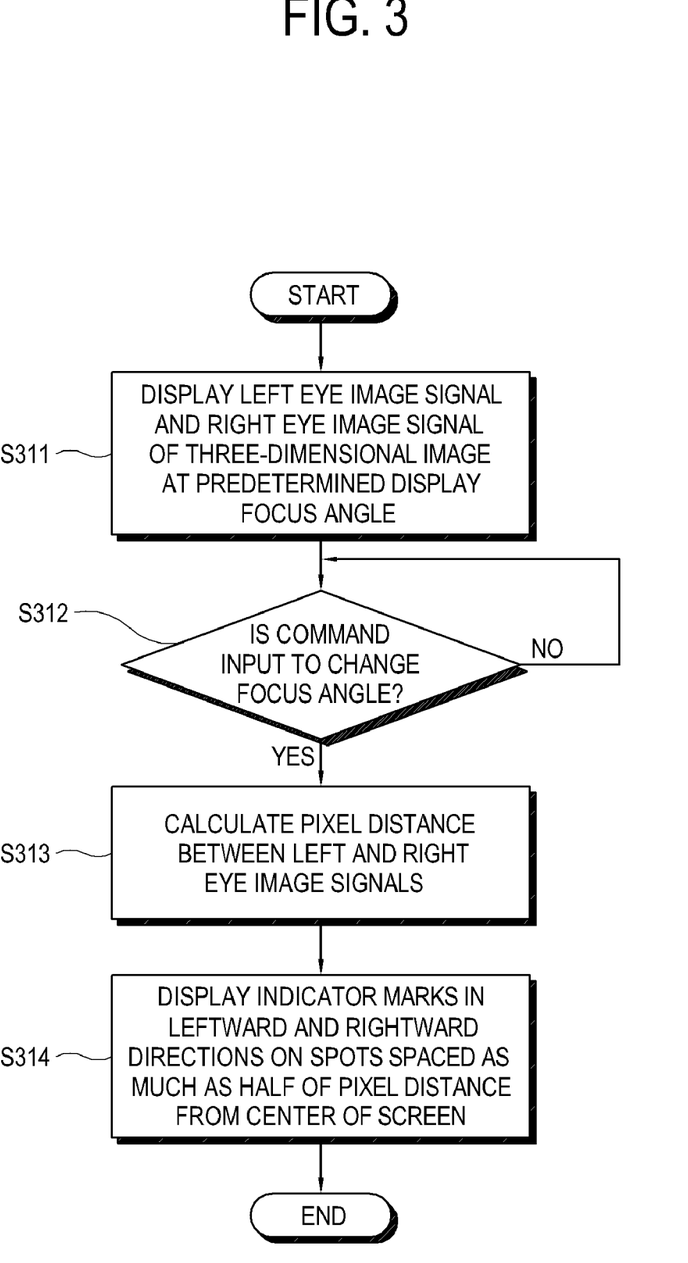
FIG. 3 is a flowchart illustrating a method of displaying a three-dimensional image according to the exemplary embodiment of the present invention.

FIG. 3 is a flowchart to describe the three-dimensional image display method according to the exemplary embodiment of the present invention.

Referring to FIG. 3, the left eye image signal and the right eye image signal of the three-dimensional image are displayed at the predetermined display focus angle (S311).

When the three-dimensional image is displayed, the controller 230 determines whether to change a viewing focus angle of a viewer with respect to the display focus angle (S312). The determination of whether to change the viewing focus angle is made based on a focus change command. For example, if a viewer does not see the three-dimensional effect while viewing the three-dimensional image because viewing focus angle of the viewer does not conform to the display focus angle of the image source and determines that the viewing focus angle should be changed, a viewer may input the command to change the viewing focus angle through a focus-changing button or key provided in the display apparatus or a remote controller controlling the display apparatus. The controller 230 may control the image signal processor 220 to periodically display a particular indicator mark corresponding to the display focus angle regardless of a viewer's command. Thus, a viewer views the indicator mark and changes the viewing focus angle accordingly.

If it is determined to change the viewing focus angle at operation S312, the controller 230 calculates the pixel distance between the left eye image signal and the right eye image signal (S313).

As shown in FIG. 4, the controller 230 analyzes the display distribution of the left eye image signal and the right eye image signal according to the histogram to calculate the physical distance D between the display distributions of the left and right eye image signals, and convert the physical distance D into the pixel distance. The image signal processor 220 (e.g., a scaler) converts the physical distance D into the pixel distance. The scaler already knows pixel information (e.g., 1280*720) of a certain screen (e.g. a screen of high definition TV), and calculates pixels corresponding to the physical distance D if the information on the physical distance D is received. The image signal processor 220 may calculate the pixel distance by using other types of information or data related to image signal analysis instead of using the display distribution according to the histogram as described above.

Figure 5:
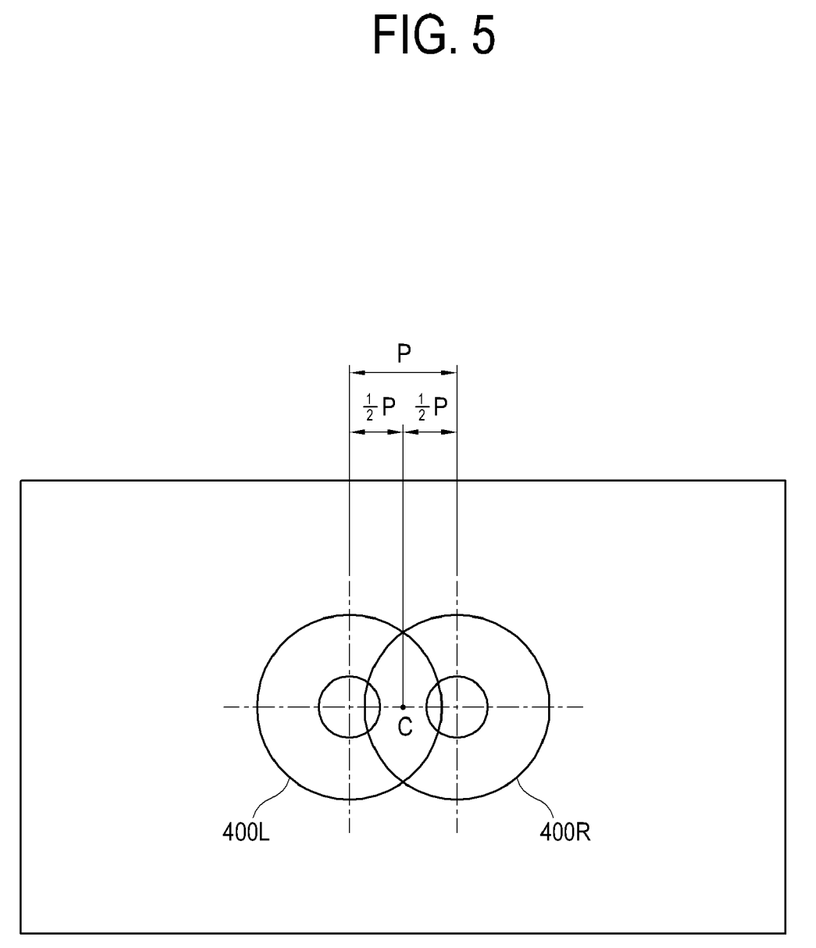
FIG. 5 illustrates indicator marks which are displayed at positions spaced from a center of a screen in leftward and rightward directions, according to the method of displaying the three-dimensional image of the present invention.

If the calculation of the pixel distance is completed, the indicator marks 400L and 400R are respectively displayed at positions spaced as much as a half of the calculated pixel distance P from the center C of the display unit 210 in leftward and rightward directions (S314), as shown in FIG. 5.

Here, the indicator marks 400L and 400R may be generated and stored in advance, or may be generated as necessary.

Figure 6:
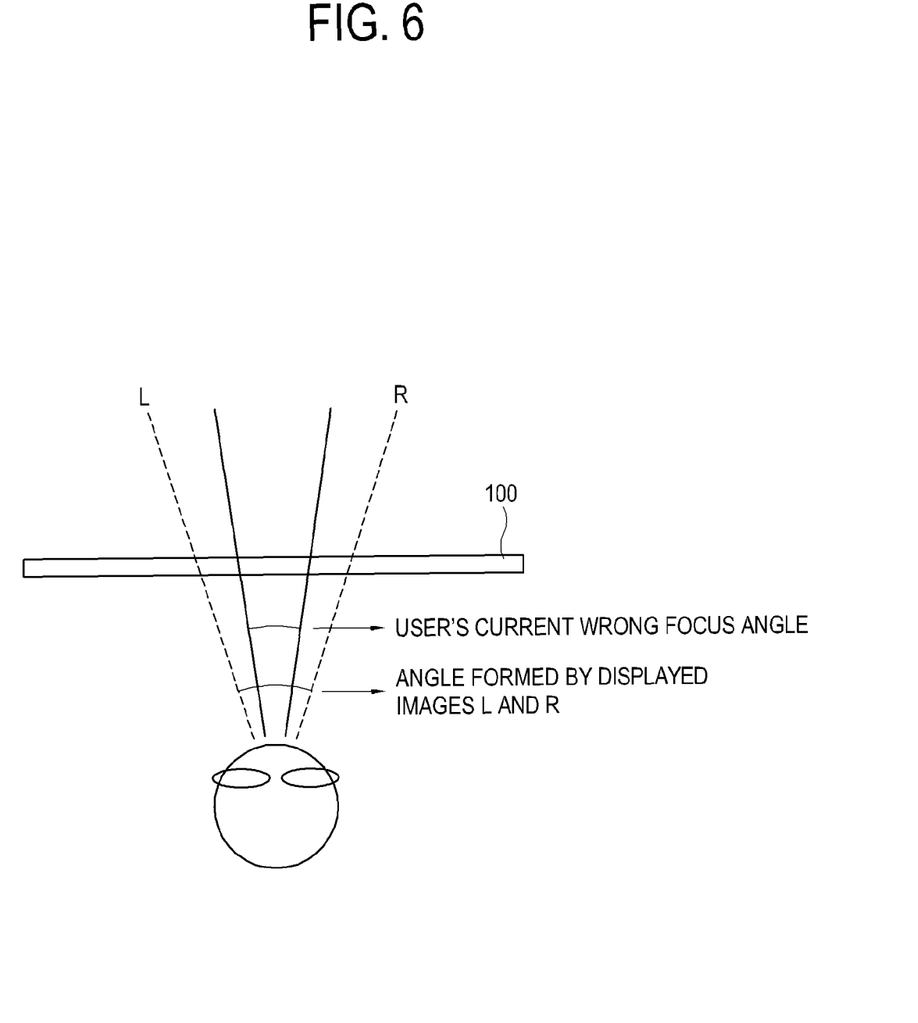
FIGS. 6 and 7 illustrate a change of a focus angle (viewing angle) of a viewer according to the exemplary embodiments of the present invention.
Figure 7:
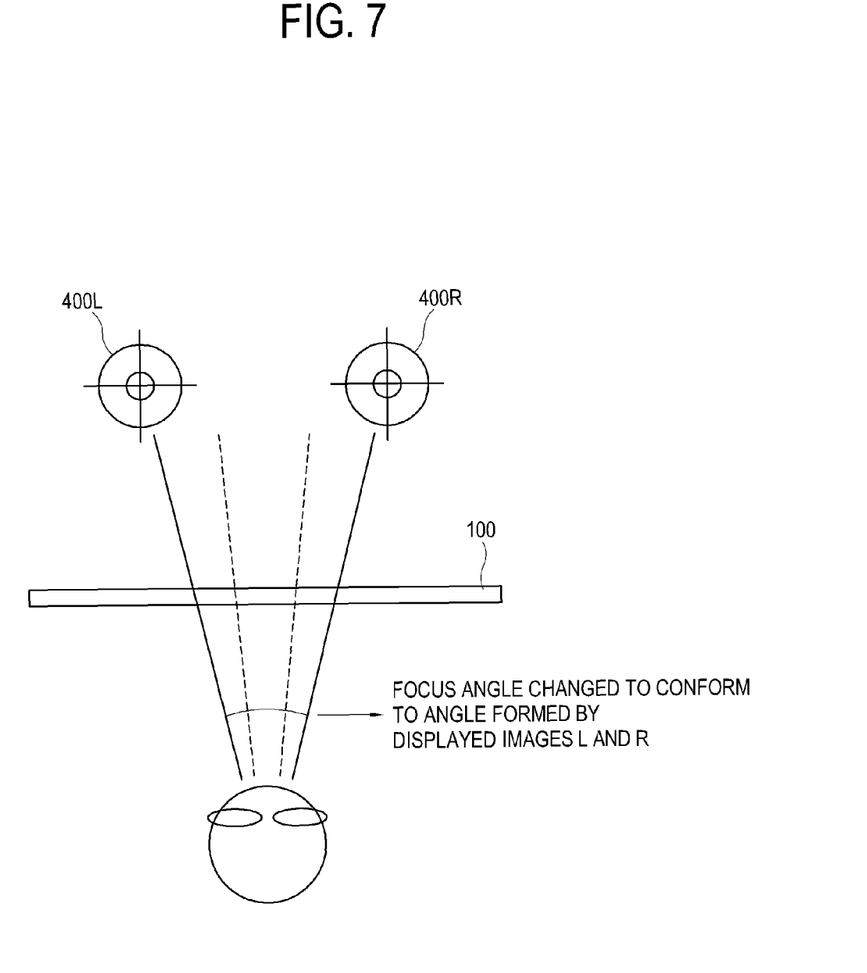

FIGS. 6 and 7 illustrate changing a viewing focus angle of a viewer according to the three-dimensional image display method of the present invention. If a viewing focus angle does not conform to the display focus angle formed by left and right eye images L and R displayed on the screen 100 (image-forming screen) as shown in FIG. 6, the left and right indicator marks 400L and 400R are displayed on the screen 100 as shown in FIG. 7. Then, a viewer views the indicator marks 400L and 400R, and changes the viewing focus angle according the display focus angle formed by the displayed left and right eye images L and R, thereby changing the viewing focus angle. A viewer perceives the precise three-dimensional effect of the three-dimensional image by changing the viewing focus angle.

As described above, the exemplary embodiments of the present invention provide a three-dimensional image display method and apparatus which displays a three-dimensional image and changes a viewing focus angle by displaying a particular indicator mark on a screen if the viewing focus angle does not conform to a display focus angle of an object recorded in an image source.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A three-dimensional image display method, the method comprising:
   displaying a three-dimensional image including a left eye image signal and a right eye image signal displayed at a display focus angle;
   calculating a pixel distance between the left eye image signal and the right eye image signal if it is determined to change a viewing focus angle with respect to the display focus angle; and
   displaying indicator marks at positions which is determined on the basis of the pixel distance.

2. The method according to claim 1, wherein the indicator marks are displayed at positions spaced as much as a half of the pixel distance from a center of a screen in leftward and rightward directions.

3. The method according to claim 1, further comprising determining whether to change the viewing focus angle with respect to the display focus angle by receiving a command to change the focus.

4. The method according to claim 1, wherein the calculating the pixel distance comprises analyzing a display distribution of the left and right eye image signals to determine a physical distance between the display distribution of the left and right eye image signals according to a histogram, and converting the physical distance into the pixel distance.

5. The method according to claim 1, further comprising storing the indicator marks in advance.

6. A three-dimensional image display apparatus comprising:
   a display unit on which a three-dimensional image including a left eye image signal and a right eye image signal are displayed at a display focus angle;
   an image signal processor; and
   a controller which calculates a pixel distance between the left eye image signal and the right eye image signal if it is determined to change a viewing focus angle with respect to the display focus angle, and controls the image signal processor to display indicator marks at positions which is determined on the basis of the pixel distance.

7. The apparatus according to claim 6, wherein the indicator marks are displayed at positions spaced as much as a half of the pixel distance from a center of a screen in leftward and rightward directions.

8. The apparatus according to claim 6, further comprising an input unit through a command is input to change the viewing focus angle, wherein the controller determines to change the viewing focus angle with respect to the display focus angle if the command is input through the input unit.

9. The apparatus according to claim 6, wherein the controller analyzes display distributions of the left and right eye image signals according to a histogram to calculate a physical distance between the display distributions of the left and right eye image signals, and calculates the pixel distance between the left and right eye image signals by converting the physical distance into the pixel distance.

10. The apparatus according to claim 6, further comprising a memory which stores the indicator marks therein.

* * * * *